United States Patent
Makio et al.

(10) Patent No.: US 6,233,260 B1
(45) Date of Patent: May 15, 2001

(54) REDUCED-NOISE SECOND-HARMONIC GENERATOR AND LASER APPLICATION DEVICE

(75) Inventors: Satoshi Makio, Kumagaya; Masayoshi Sato, Fukaya; Hidenobu Ishida; Hironari Matsumoto, both of Kumagaya, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/271,245

(22) Filed: Mar. 17, 1999

(30) Foreign Application Priority Data

Mar. 20, 1998 (JP) .................................................. 10-072240

(51) Int. Cl.$^7$ ....................................................... H01S 3/10

(52) U.S. Cl. ................................. 372/22; 372/20; 372/98; 372/92; 372/32

(58) Field of Search .................................. 372/22, 20, 98, 372/92, 32

(56) References Cited

U.S. PATENT DOCUMENTS 5,588,014   12/1996   Okazaki et al. .

*Primary Examiner*—Leon Scott, Jr.
(74) *Attorney, Agent, or Firm*—Staas & Halsey LLP

(57) ABSTRACT

The free spectral range dependent on the length of an oscillator is put in a relation of integral times with respect to the free spectral range dependent on the length of at least a nonlinear optical crystal or a wavelength selection SHG output element. Thereby, reduced noise in the output of a second-harmonic generator is intended.

30 Claims, 11 Drawing Sheets

REDUCED-NOISE SECOND-HARMONIC GENERATOR AND LASER APPLICATION DEVICE

BACKGROUND OF THE INVENTION (i) Field of the Invention

The present invention relates to a solid laser source in the field of optoelectronics and a laser application device using the solid laser source, particularly to reduction of noise in an output of a second-harmonic generator.

(ii) Description of the Related Art

With the progress of the highly information-oriented age, in the field of optical recording such as optical disk devices and laser printers, for improving the recording density or for meeting the requirements of high-speed printing, needs of laser source of shorter wavelength rise. But, in a blue range (wavelength of 400 to 480 nm) wherein there are many needs at practical product level, gas laser sources such as He—Cd (helium—cadmium) lasers and Ar (argon) lasers are only put to practical use. When a gas laser source is put in an optical disk device or the like, though the recording density can be considerably improved because of a short wavelength, since the size of the laser source is larger than that of the device for being equipped with it and the power consumption becomes great, putting it to practical use is hindered. But, though there is an example in which a gas laser source is put in a certain kind of laser printer, it is a limited kind for a special application. In view of such conditions, it is of urgent necessity to downsize the short-wavelength laser source and lower the power consumption of it.

Well, since the laser oscillation in the blue range is very difficult in a solid laser as described above, an optical second-harmonic generation (hereinafter called SHG for short) method using a nonlinear optical crystal as a method for obtaining a short wavelength not directly but indirectly is proposed and developed for practical use. In an SHG system, at least a solid laser crystal and a nonlinear optical crystal are disposed in an oscillator composed of a pair of mirrors, a base wave of a long wavelength is first generated by exciting the solid laser crystal from the exterior of the oscillator, and a second harmonic of the base wave is next generated by the nonlinear optical crystal. Besides, because the performance of SHG is closely connected with the characteristics of a semiconductor laser as an exciting light source, it is in a relation that the study for improvement of SHG is advanced always after increasing the power of the semiconductor laser or improving the high stability or the like of it. But, with improvement of the performance of the semiconductor laser, the SHG system has focussed the spotlight of attention. Putting the advantages of the above-described SHG in order, (1) it can be constructed in a small size; (2) a low power consumption can be realized; (3) a high stability of the SHG output by solidity can be intended; and (4) a long duration becomes possible.

As a solid laser source by which a light in the blue range is obtained, there is an internal oscillator type SHG system as shown in FIG. 13 for example.

In FIG. 13, an exciting light 31 from a semiconductor laser (not shown) is introduced into a solid laser crystal 4 to excite the solid laser crystal 4. The excited solid laser crystal emits a specific light according to its composition. This is a base wave light. Accordingly, the wavelength or range of the base wave is determined by the material of the solid laser crystal. But, although there is arbitrariness in material, since the kinds of solid laser crystals are not so much, the range of wavelength to select is necessarily limited. For example, when YAG (Nd:$Y_3Al_5O_{12}$) is used as the solid laser crystal, a base wave of approximately circular polarization is obtained in a fairly narrow range of wavelength with the center of 1064 nm, while, in an LiSAF crystal described later, it is a base wave of nearly linear polarization with a considerably wide range of wavelength of 750 to 1000 nm. Further, the excited base wave light is introduced into a nonlinear optical crystal (SHG crystal) 6. In the nonlinear optical crystal, a wavelength that meets the phase-matching conditions determined by the relation between the refractive index and the length of optical path in each crystal axis, namely, a second harmonic (SHG output) 33 is emitted. The first and second laser mirrors 3 and 7 constituting an oscillator are given the following characteristics of wavelength selection. That is, the first laser mirror 3 allows the exciting light 31 to pass but reflects a base wave beam 32 and the SHG output 33. On the other hand, the second laser mirror 7 reflects the base wave beam 32 but is made to have a good transmission characteristic for the SHG output 33. In short, the oscillator has the construction by which, while the base wave is shut up, the generated second harmonic is taken out to the exterior of the oscillator. By this construction, mixing of an outer disturbance such as a reflected return light from the exterior of the oscillator can be restrained without providing an optical isolator on the emission side, as a result, the influence of the outer disturbance on the oscillation wavelength of the base wave can be made small and there is another merit related to a stable oscillation.

Well, as disclosed in U.S. Pat. No. 4,811,349, a laser device in which an LiSAF (Cr:$LiSrAlF_6$; fluorolithium-strontium-aluminum with addition of chromium) crystal that oscillates in a wide range of wavelength of 750 to 1000 nm is used as a solid laser crystal is proposed. By using this LiSAF, by which the band of oscillation wavelength becomes remarkably broad in comparison with a conventional crystal, as the above-described internal oscillator type solid laser crystal, it becomes possible selectively to obtain a short wavelength of 375 to 500 nm and the possibility of a variable-wavelength laser source becomes open.

The present inventors have been at grips with development of an SHG light source of blue range as the second oscillation wave obtained by a nonlinear optical crystal wherein an LiSAF crystal is applied to such a semiconductor laser-exciting system as shown in FIG. 13 and an excited laser light is used as the first oscillation wave (base wave), for many years. After this, although the application scope of the SHG light does nothing but extend, in particular, needs to improve the performance of the SHG light source applied to a precisely measuring instrument become intensive more and more, and the present invention is to open the way for a solution to the stability or reduced noise of the output light. The noise in the SHG system is a low-frequency side component of 3 MHz or less in the output light. It was found that increase of noise of low frequency in the SHG laser light has a serious influence from sides of stability or accuracy of the device. Hereinafter, the mechanism of generating noise in a prior art will be described in detail.

FIG. 14 shows a construction of an SHG system in which an LiSAF crystal is applied as a solid laser crystal. Although it is basically the same construction as that in FIG. 13, a wavelength selection element 5 is provided in front of the SHG crystal 6 in the oscillator, and an SHG output 33 of a proper wavelength can be selected by this wavelength selection element 5. An exciting light 31 emitted from the semiconductor laser 11 passes through a convergent optical system 12 and the first laser mirror 3 and then is gathered in the solid laser crystal 4 of an LiSAF crystal to excite the solid laser crystal 4. Further, base wave beams 32A of required wavelengths among base wave beams 32 emitted from the solid laser crystal pass through the wavelength selection element 5 to be incident on the SHG crystal 6. A part of the base wave beams 32A is converted into an SHG light by the SHG crystal and the major part reaches the second laser mirror 7 and is reflected. Because mirror films of dielectric multilayer films for reflecting 99% or more of the base wave beams 32A are formed on the first and second laser mirrors 3 and 7, the base wave beams 32A repeat going and returning in the oscillator. While the base wave beams 32A go and return in the oscillator, emission of SHG output 33 is steadily urged by the SHG crystal 6.

As described above, by combining a solid laser capable of oscillation in a wide band and a wavelength selection element, a blue laser in the range of 375 to 500 nm can be obtained as an SHG output, and the application scope is remarkably extended. Etalon or a birefringent filter, etc. can be utilized as the wavelength selection element. FIG. 14 shows a case of a birefringent filter. The birefringent filter is constructed using a birefringent crystal such as a crystal board and a wavelength is selected by being inclined at the Brewster angle with respect to the incident beam and rotating around the normal axis z shown in the drawing.

In the above-described prior art, however, the SHG light obtained as the output contains noise of 3 MHz or less. Although many interests have been taken in the reduction or restraint of noise from way back, and measures were done, there was no effective proposal of measure. Till the present, the longitudinal mode of the base wave beam oscillated in the oscillator has been considered a cause of noise generation because it brings about multi-oscillation. Qualitatively, the following description is given. In a solid laser of internal oscillator type, because a plurality of base wave longitudinal modes are present in the oscillator at the same time, the intensities vary as the modes interfere in one another. Therefore, intensity conflicts are induced among the base wave modes and it is led in a multi-oscillation state. As a result, it is considered that noise of 3 MHz or less is brought about on the SHG output. (T. Baer, "Large-amplitude fluctuations due to longitudinal mode copling in diode-pumped intracavity-doubled Nd:YAG lasers," J. Opt. Soc. Am. B3,1175 1986).

But, from the description of the above-described physical phenomenon, for intending to reduce noise, a conclusion that a single mode state must be made and kept in the oscillator is introduced. As an actual problem, even if the single mode state is obtained, it is a considerably difficult technique to maintain the single mode with compensating changes in the external environment such as temperature and atmospheric pressure. Therefore, returning to the root to seize the essence of the problem, solution and study of the mechanism of noise generation were made again, and, based on a quite different conception from methods considered conventionally, solution of the problem of the prior art was tried and the noise reduction was successful. Since the construction of the present invention is basically the same as the prior art, although the presence of the invention is not clear in appearance, merit is in that the relation between optical parts disposed in an oscillator and the length of the oscillator is distinctly regulated. Because this is an application of an optical fundamental principle, there is universality that it is applicable to all cases of SHG lasers using solid lasers.

SUMMARY OF THE INVENTION

An object of the present invention is in providing a reduced-noise second-harmonic generator in which reduced noise in the output can be intended by putting the free spectral range dependent on the length of the oscillator in a relation of integral times with respect to the free spectral range dependent on the length of at least the nonlinear optical crystal or wavelength selection SHG output element.

DETAILED DESCRIPTION OF THE PREFERRED EMBODIMENT

Hereinafter, a preferred embodiment of the present invention will be described in detail with reference to the accompanying drawings.

For solving such problems in the prior art as described above, it is generally known to make the base wave oscillation longitudinal mode in an oscillator a single mode, but the present inventors have found that noise in an SHG light can be reduced even when it is not necessarily made a single mode. That is, there are more or less reflection lights in a boundary surface between different media. For example, because a reflection phenomenon occurs in an incident or emission surface of an SHG crystal generating an SHG light, an oscillator is partially formed based on the length of the SHG crystal. Accordingly, if the node of the oscillator longitudinal mode in an end surface of the SHG crystal is set in order that a case of the base wave to the oscillator occurs at the same time, respectively, a sum-frequency phenomenon is induced, as a result, instability of output due to conflict of modes is dissolved. In other words for this physical phenomenon, the free spectral range (hereinafter called FSR for short) corresponding to the length of the SHG crystal and the phase of FSR of the oscillator are made to coincide with each other. The present invention is to regulate the conditions for inducing this sum-frequency phenomenon and stabilizing the SHG output light.

Figure 13:
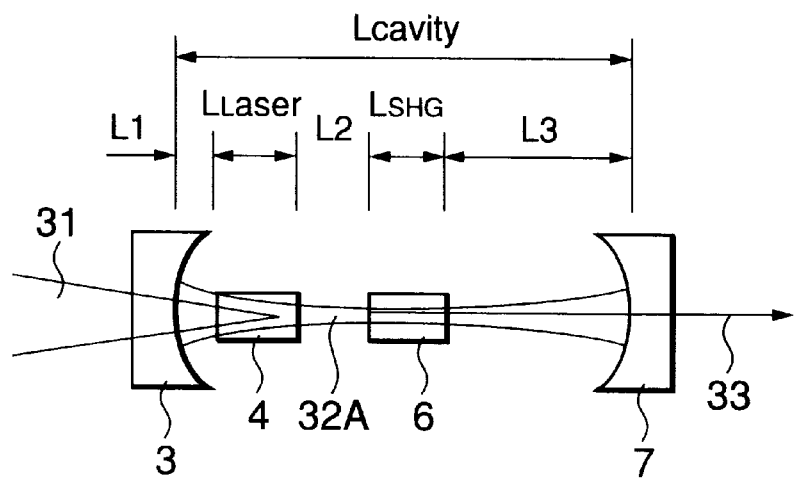
FIG. 13 is a view of a prior art internal oscillator type SHG laser device.

Next, the principle of the present invention will be described in detail on the basis of the arrangement shown in FIG. 13. When the distance between the first laser mirror 3 and solid laser crystal 4 is L1, the distance between the solid laser crystal 4 and SHG crystal 6 is L2, and the distance between the SHG crystal 6 and second laser mirror 7 is L3, the total length $L_{cavity}$ of the oscillator is given by the following expression.

$$L_{cavity} = L1 + L2 + L3 + n_{Laser} \times L_{Laser} + n_{SHG} \times L_{SHG} \quad (1)$$

Where $n_{Laser}$ and $L_{Laser}$ represent the refractive index and length of the solid laser crystal, respectively, and $n_{SHG}$ and $L_{SHG}$ represent the refractive index and length of the SHG crystal, respectively. Here, assuming that the wavelength in the oscillator is λ, the free spectral range $FSR_{cavity}$ of this laser oscillator is given by $$FSR_{cavity} = N \times \lambda^2 / (2 L_{cavity}) \quad (2)$$

and $FSR_{SHG}$ of the SHG crystal is given by the following expression.

$$FSR_{SHG} = M \times \lambda^2 / (2 n_{SHG} \times L_{SHG}) \quad (3)$$

Here, M and N represent positive integers indicating the degree of mode.

As described above, for reducing noise in an SHG output, it is a case that the left sides of the expressions (2) and (3) are equal to each other. That is, it is a case that $FSR_{cavity} = FSR_{SHG}$ is satisfied. Transforming and arranging the expressions in consideration of this condition, the length $L_{SHG}$ of the SHG crystal can be expressed as follows.

$$L_{SHG} = M \times (L1 + L2 + L3 + n_{Laser} \times L_{Laser}) / (N - M) \times n_{SHG} \quad (4)$$

Figure 1:
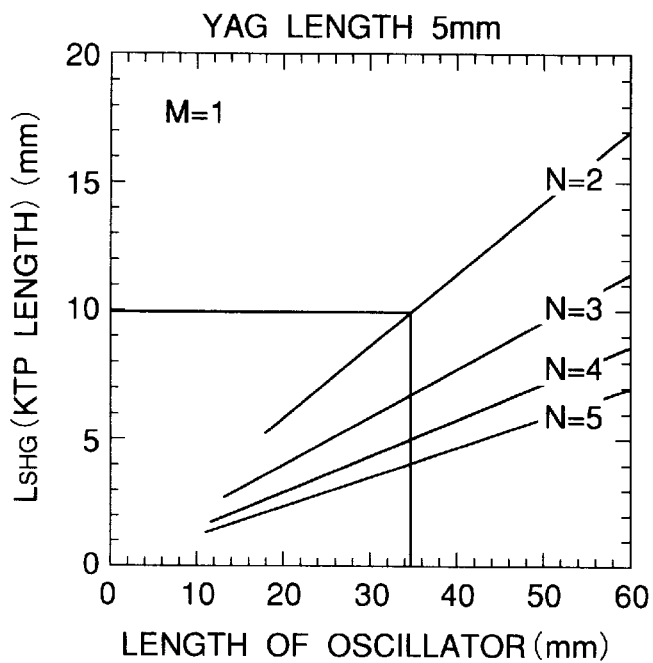
FIG. 1 is a graph showing a relation between a KTP crystal and the length of an oscillator according to the present invention.

When the relation of the expression (4) is illustrated in a range of practical use, it is as FIG. 1. FIG. 1 shows calculation results when Nd:YAG of $L_{Laser}$=5 mm was used as the solid laser crystal and a KTP crystal was applied as the SHG crystal, wherein the length of the oscillator is shown on the horizontal axis and the length of the KTP crystal is shown on the vertical axis. This example of calculation is in case of M=1, and N=2 to 5 are shown as parameters. For example, when N=2, if the length of the KTP crystal is selected into $L_{SHG}$=10 mm, the length of the oscillator is $L_{cavity}$=34.5 mm, in this case, it can be intended to reduce noise in an SHG output.

Figure 2:
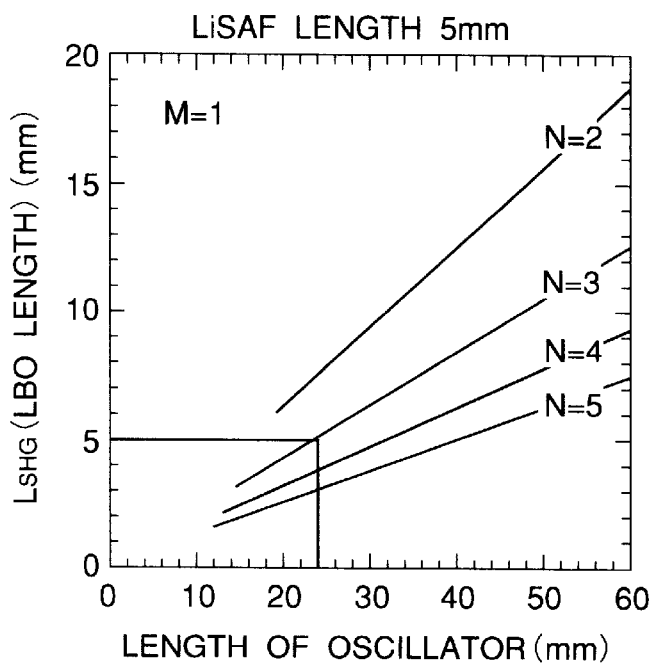
FIG. 2 is a graph showing a relation between an LBO crystal and the length of an oscillator according to the present invention.
Figure 14:
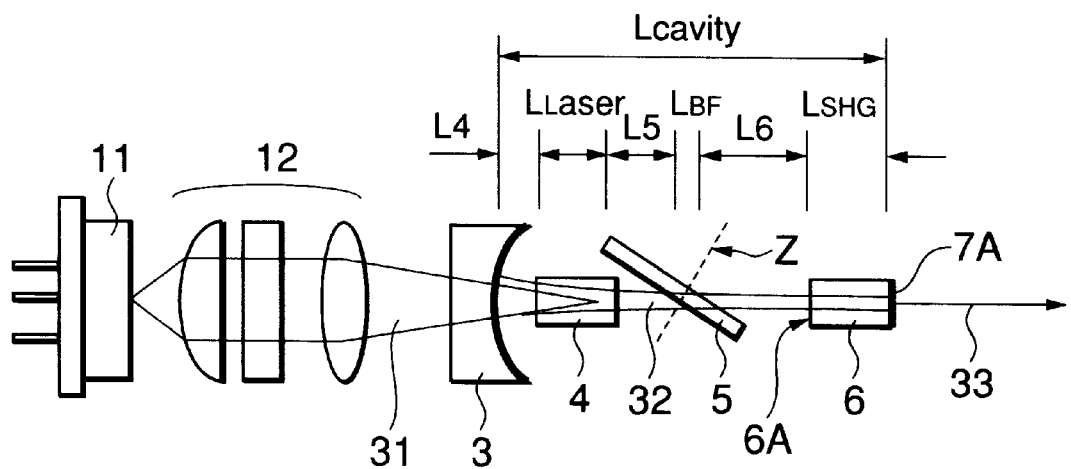
FIG. 14 is a view of another prior art example.

Similarly, a case of FIG. 14 in which there is a birefringent filter in an oscillator will be examined. Defining the length of each part as shown in the drawing and putting the same assumption as the case of FIG. 13, relations $$L_{cavity} = L4 + L5 + L6 + n_{Laser} \times L_{Laser} + n_{BF} \times L_{BF} + n_{SHG} \times L_{SHG} \quad (5)$$

$$L_{SHG} = M (L4 + L5 + L6 + n_{Laser} \times L_{Laser} + n_{BF} \times L_{BF}) / (N - M) \times n_{SHG} \quad (6)$$

are obtained. $n_{BF}$ in the above expressions represents the refractive index of the birefringent filter. Calculation results by the above expressions are shown in FIG. 2. Cr:LiSAF of $L_{Laser}$=5 mm was used as the solid laser crystal and an LBO ($LiB_3O_5$) single crystal was used as the SHG crystal. When N=3, the length of the oscillator is 24.2 mm to the length of the LBO crystal of 5 mm.

As understood from the description of the above-described principle, the present invention can be changed in expression to a reduced-noise second-harmonic generator comprising a solid laser crystal for generating a first oscillation wave, and an oscillator having an SHG crystal for conversion in wavelength into a second harmonic as a second oscillation wave by the manner that said first oscillation wave is used as the base wave, characterized in that end surfaces of said nonlinear optical crystal form the oscillator for said first oscillation wave, and the free spectral range dependent on the length of said nonlinear optical crystal is integral times as large as the free spectral range dependent on the length of the oscillator of said first oscillation wave.

Besides, in the construction shown in FIG. 14, because the present invention is dependent on the magnitude of reflectance of the oscillator, if the reflectance of the second laser mirror 7A formed on the emission surface of the SHG crystal is regulated into 99% or more with respect to the base wave as the first oscillation wave, and the reflectance of the incident side surface 6A of the base wave beam 32A is regulated into 5% or less, a more desirable effect can be obtained. Further in addition, by employing an optimization method, the shortest length of the oscillator can be obtained.

EXAMPLE 1

An example of the present invention will be described. In FIG. 14, an exciting beam 31 emitted from a semiconductor laser 11 is converged by a convergent optical system 12 to excite a solid laser crystal 4. A semiconductor laser of AlGaInP made by SDL (Spectra Diode Lab.) is used as the semiconductor laser 11, in which the output is 500 mW and the oscillation wavelength is 670 nm. Besides, the convergent optical system 12 is a combination of two cylindrical lenses and a single lens (f=30 mm).

In the laser oscillator, the solid laser crystal 4, a wavelength selection element 5 and the SHG crystal 6 are disposed. The first laser mirror 3 was provided with a high-reflection (hereinafter called HR for short) coating which allows the wavelength of the exciting light from the semiconductor laser to pass 85% or more and whose reflectance to the wavelength of the base wave is 99% or more. The construction of the oscillator was a concave-flat oscillator, wherein the radius of curvature of the first laser mirror 3 was 20 mm and the length of the oscillator was 18 mm. As the solid laser crystal 4, an LiSAF crystal (3×3×5 mm) with the Cr-addition amount of 1.5 mol % was used and an antireflection (hereinafter called AR for short) coating film of the reflectance of 5% or less to the wavelength of the exciting light and the wavelength of the base wave is formed on each crystal end surface. As the SHG crystal 6, an LBO crystal ($LiB_3O_5$) of 3×3×5 mm was used.

On the rear end surface of the LBO crystal, namely, on the emission side of the SHG crystal, an HR coating of the reflectance of 99% or more to the wavelength of the base wave and an AR coating of the reflectance of 1% or less to the SHG wavelength were formed to form the second laser mirror 7. Besides, on the front end surface of the LBO crystal, namely, on the incident surface side, an AR coating of the reflectance of 0.2% or less to the wavelength of the base wave was provided. Besides, as the wavelength selection element 5, a birefringent filter comprising a single crystal board of the thickness of 1 mm was used, and wavelength selection was performed by disposing it at the Brewster angle with respect to the optical axis and rotating it around the normal axis z shown in the drawing. Regulating into the wavelength of the base wave at which the conversion efficiency of the LBO crystal as the SHG crystal 6 becomes the maximum, the SHG output of 20 mW was obtained.

Figure 15A:
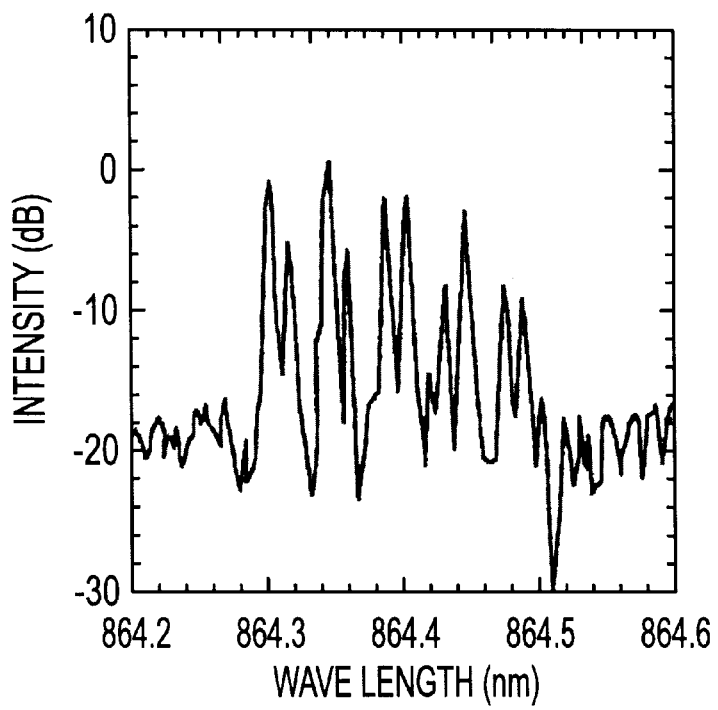
FIGS. 15(a) and 15(b) are graphs showing relations between a base wave and an oscillation wavelength of SHG of a prior art.
Figure 15B:
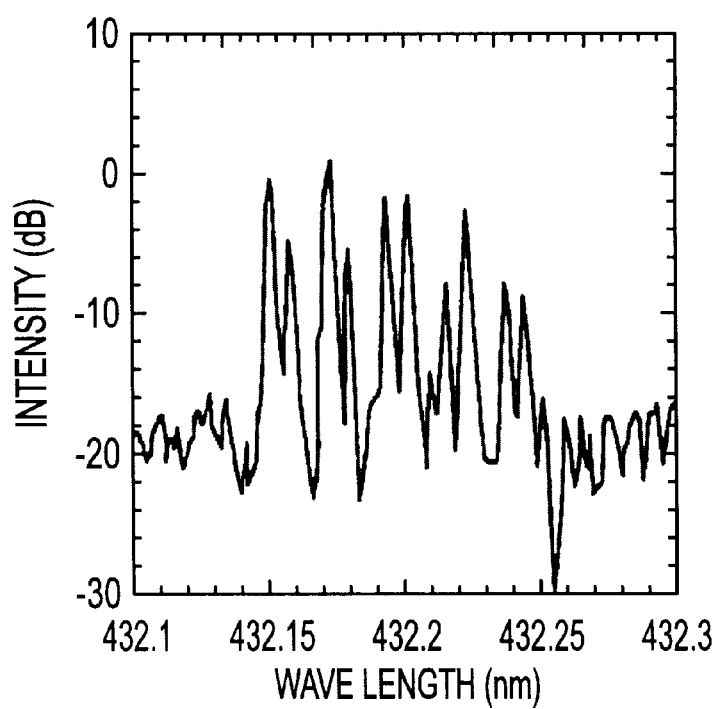
Figure 16:
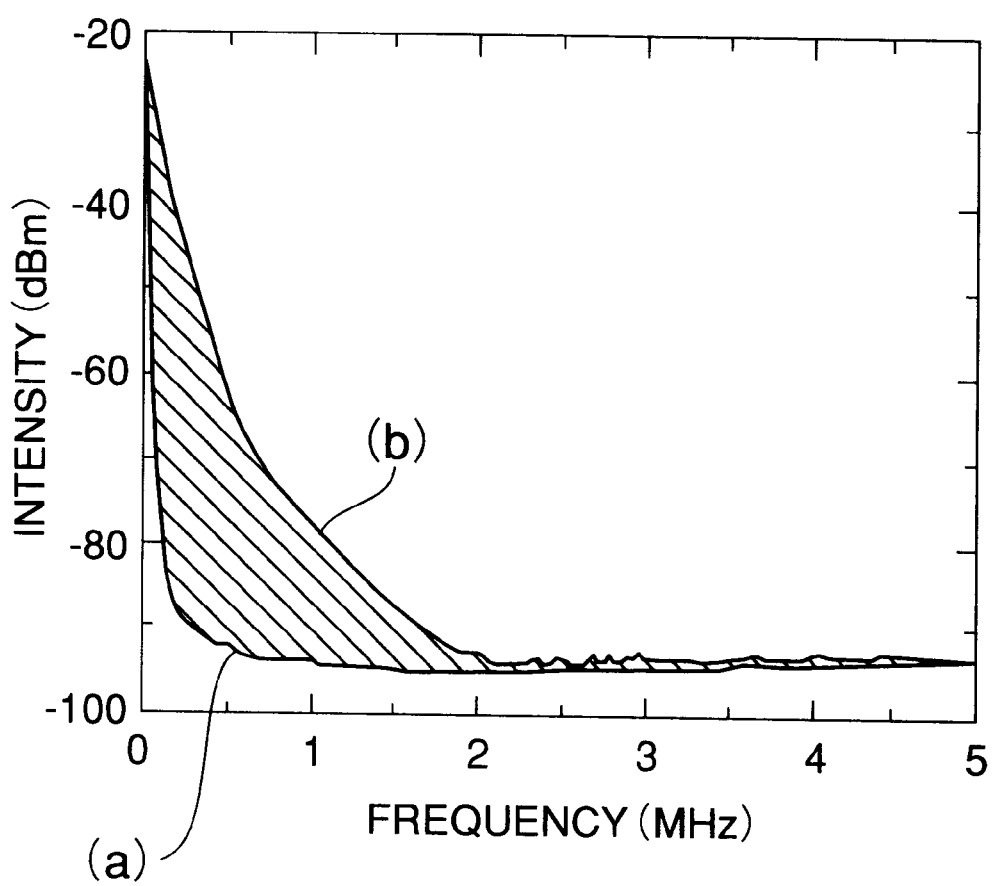
FIG. 16 is a graph showing a high-frequency noise characteristic of an SHG output.

FIGS. 15 show spectra when the oscillation wavelength characteristics of (a) the base wave and further (b) the SHG output were measured by a highly resolving spectrum analyzer (Q8347 made by Advantest) of a Michelson interferometer type in case of adjusting to such a wavelength that the SHG output becomes the maximum as 20 mW by the wavelength selection element. It is found that, in the base wave (a), ten longitudinal modes oscillate at intervals of about 0.02 nm, and (b) the SHG output oscillates at the wavelength of SHG corresponding to a half of the base wave. The SHG output light 33 at this time was received by a high-speed Si photodiode and its output was measured by an RF spectrum analyzer. The high-frequency noise characteristics at this time are shown in FIG. 16. In FIG. 16, (a) shows so-called background noise in case of receiving no light, and (b) shows a frequency characteristic in case of receiving an SHG light. As found from the drawing, it is found that noise (oblique-lines portion) is generated at 3 MHz or less.

Figure 3A:
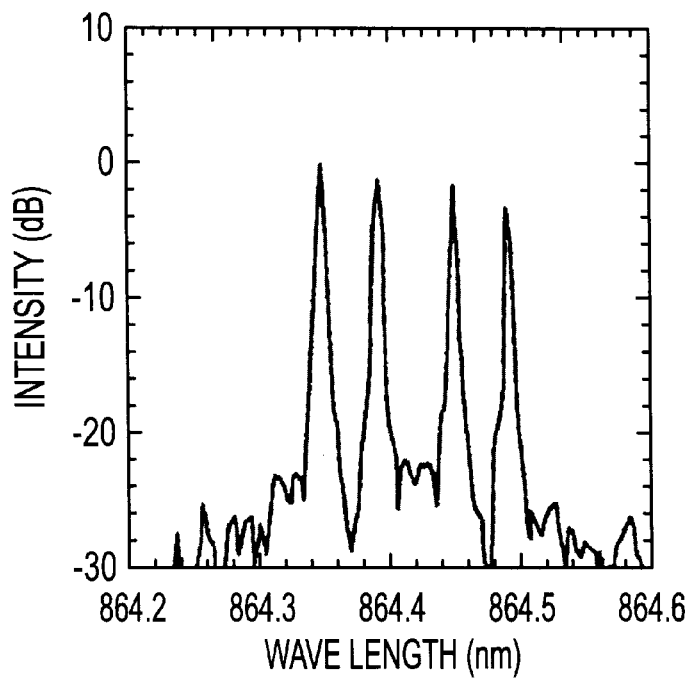
FIGS. 3(a) and 3(b) are graphs showing relations between a base wave and an oscillation wavelength of SHG according to the present invention.
Figure 3B:
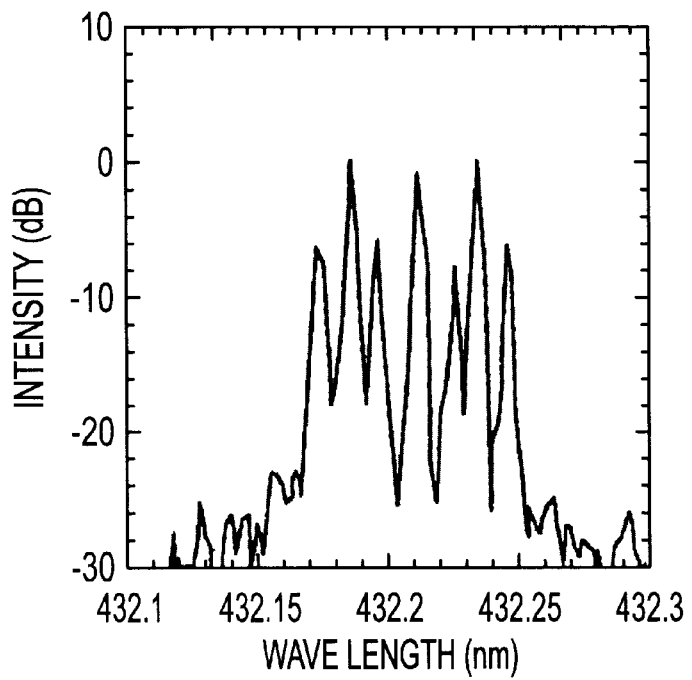
Figure 4:
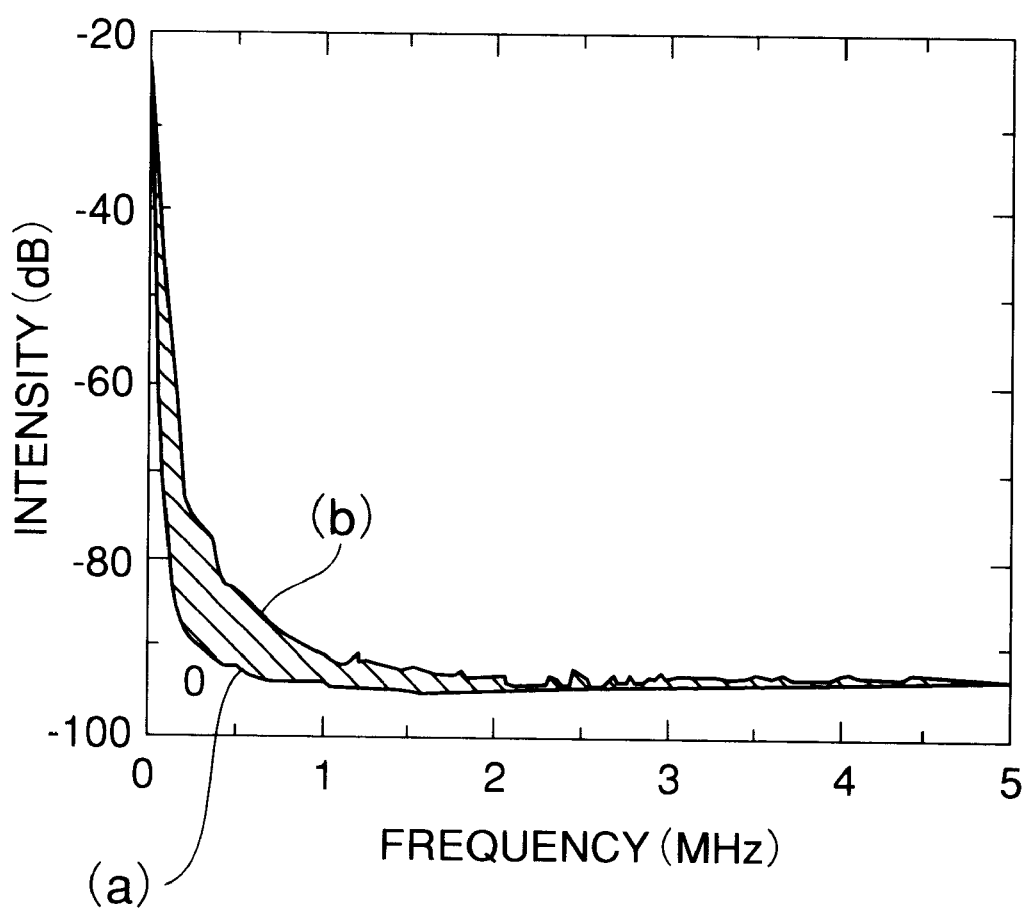
FIG. 4 is a graph showing a high-frequency noise characteristic of an SHG output according to the present invention.

In the construction of FIG. 14, in case of slightly moving the position of the SHG crystal 6, the oscillation wavelength characteristics of (a) the base wave and (b) the SHG output are shown in FIGS. 3. It is found that the base wave oscillates in four longitudinal modes at intervals of about 0.04 nm and SHG oscillates at the wavelength of SHG corresponding to a half of the base wave and the sum-frequency. The noise characteristic in this case is shown in FIG. 4. In FIG. 4, (a) shows the zero level in case of receiving no light, and (b) shows a frequency characteristic in case of receiving an SHG light. Comparing FIG. 4 with FIG. 16, it is found that the noise component which was present at 3 MHz or less is considerably reduced. After all, it is found that, by slightly shifting the length of the oscillator in an optical axis direction, high-frequency noise is reduced. This shows that the end surfaces of the SHG crystal became the nodes of the oscillator longitudinal mode, a sum-frequency phenomenon occurred to restrain the degree of mode conflicts, and it connected to the effect of noise reduction.

Figure 5:
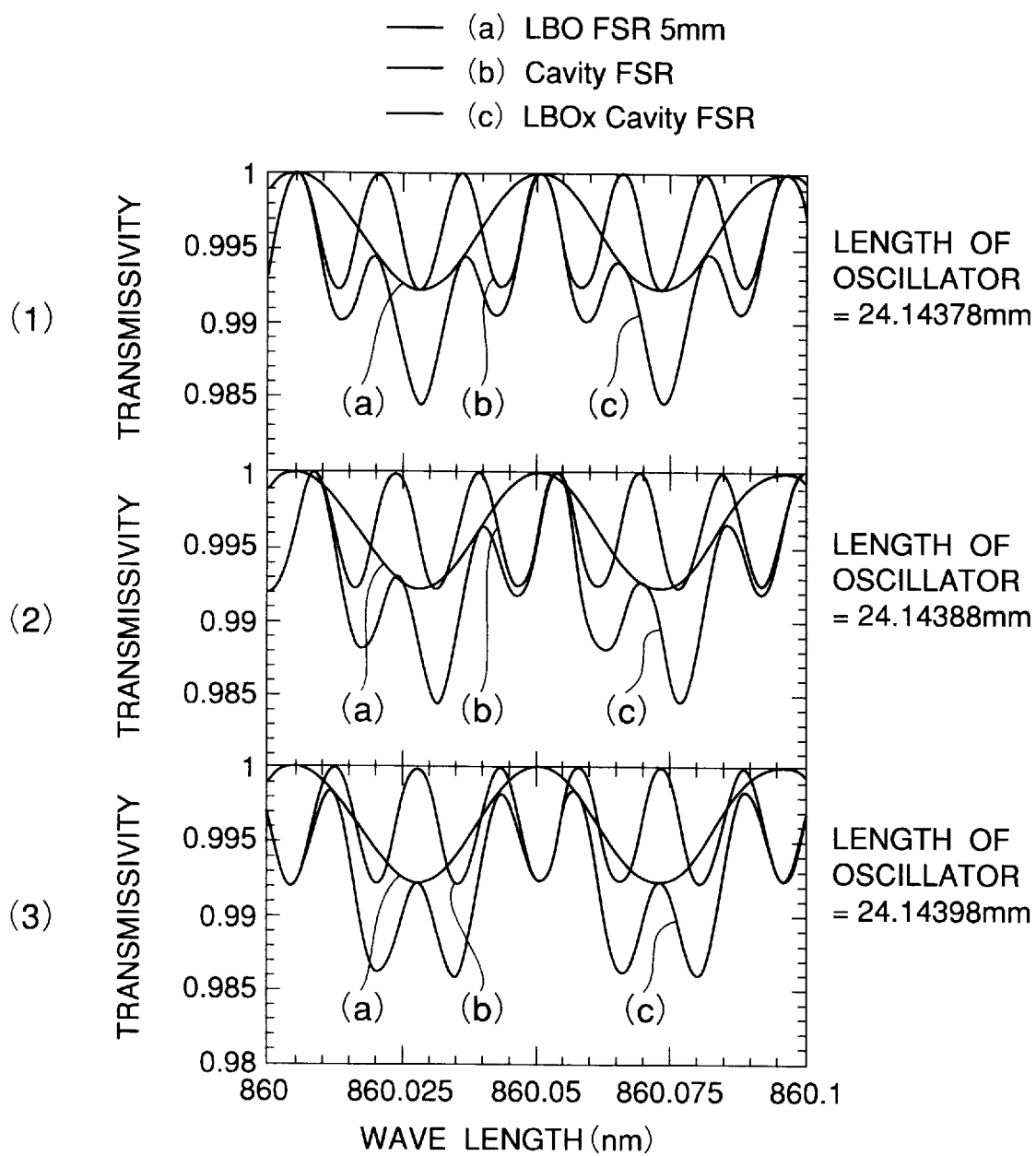
FIG. 5 are graphs showing oscillation wavelength characteristics.

FIG. 5 show three cases wherein the length of the oscillator is changed, of results of calculating the transmission wavelength characteristic of each case of the transmission wavelength characteristic in an LBO crystal of the length of 5 mm (a), the transmission wavelength characteristic to the length of the oscillator (b), and (a)×(b) as a multiplication effect of them. Here, the calculation was made with 0.2% of the full reflectance of the LBO crystal and oscillator. From the drawing, it is found that, when the length of the oscillator is changed, in case (1) that the phase of LBO coincides with the phase of the oscillator, it oscillates at intervals of about 0.04 nm, in case (2) that the phase shifts by a half of the wavelength, it oscillates at intervals of about 0.02 nm. After all, it is found that (1) coincides with the oscillation wavelength characteristic of the base wave in a low-noise state and (3) coincides with the oscillation characteristic in a noise state.

Figure 6:
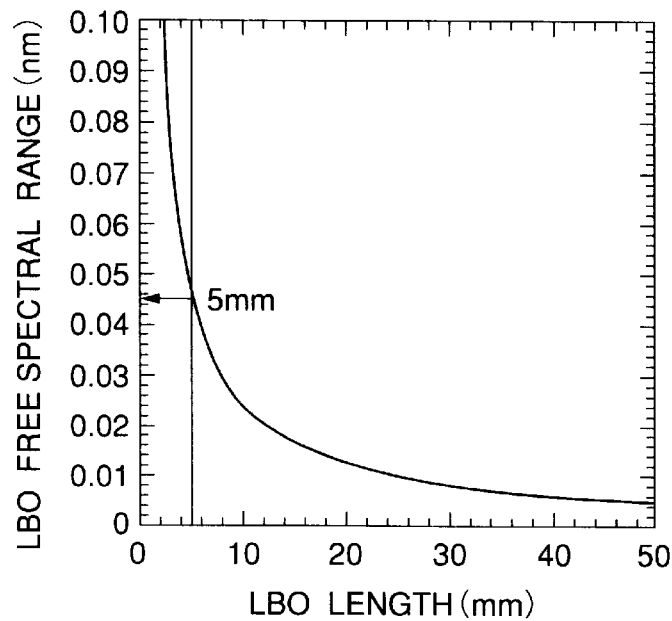
FIG. 6 is a graph showing an FSR characteristic of an LBO crystal.

The length d of the crystal that an LBO crystal as a nonlinear optical crystal was cut out in order to convert into an SHG light under the phase-matching conditions of type I at the base wave $\lambda$=860 nm, and the relation of $FSR=\lambda^2/2nd$ to it, are shown in FIG. 6. n represents the refractive index. From FIG. 6, when the length is 5 mm, FSR=0.04594971 nm can be calculated.

Figure 7:
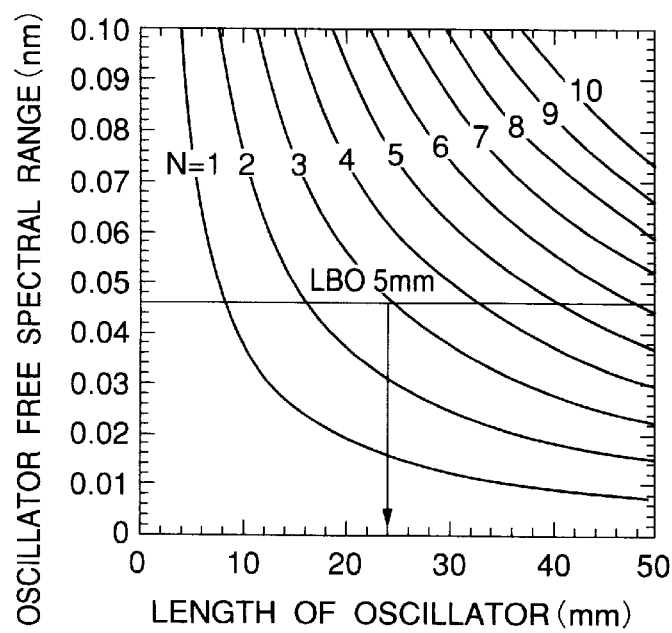
FIG. 7 is a graph showing a relation between the length of an oscillator and FSR.

Further, the relation of FSR to the length L of the oscillator is shown in FIG. 7. The group of curves in the drawing shows cases of modes to N=10. As apparent from the drawing, it is found that a plurality of intersecting points with FSR=0.04594971 nm in case of the length of LBO of 5 mm are present in integral times of FSR of the length of the oscillator. In the length of the oscillator of this intersecting point, the mode of the oscillator longitudinal mode in the end surface of the LBO crystal becomes a node. After all, at this state, a sum-frequency phenomenon occurs to stabilize the total output.

In the oscillator of FIG. 14, in case of considering the refractive index of the crystal, etc., the effective length of the oscillator is about 24.2 mm and it is found that it coincides with the point of three times as integral times of the base FSR of the oscillator. By accurately adjusting the length of the oscillator to this point, it becomes a reduced-noise second-harmonic generation light source.

Figure 8:
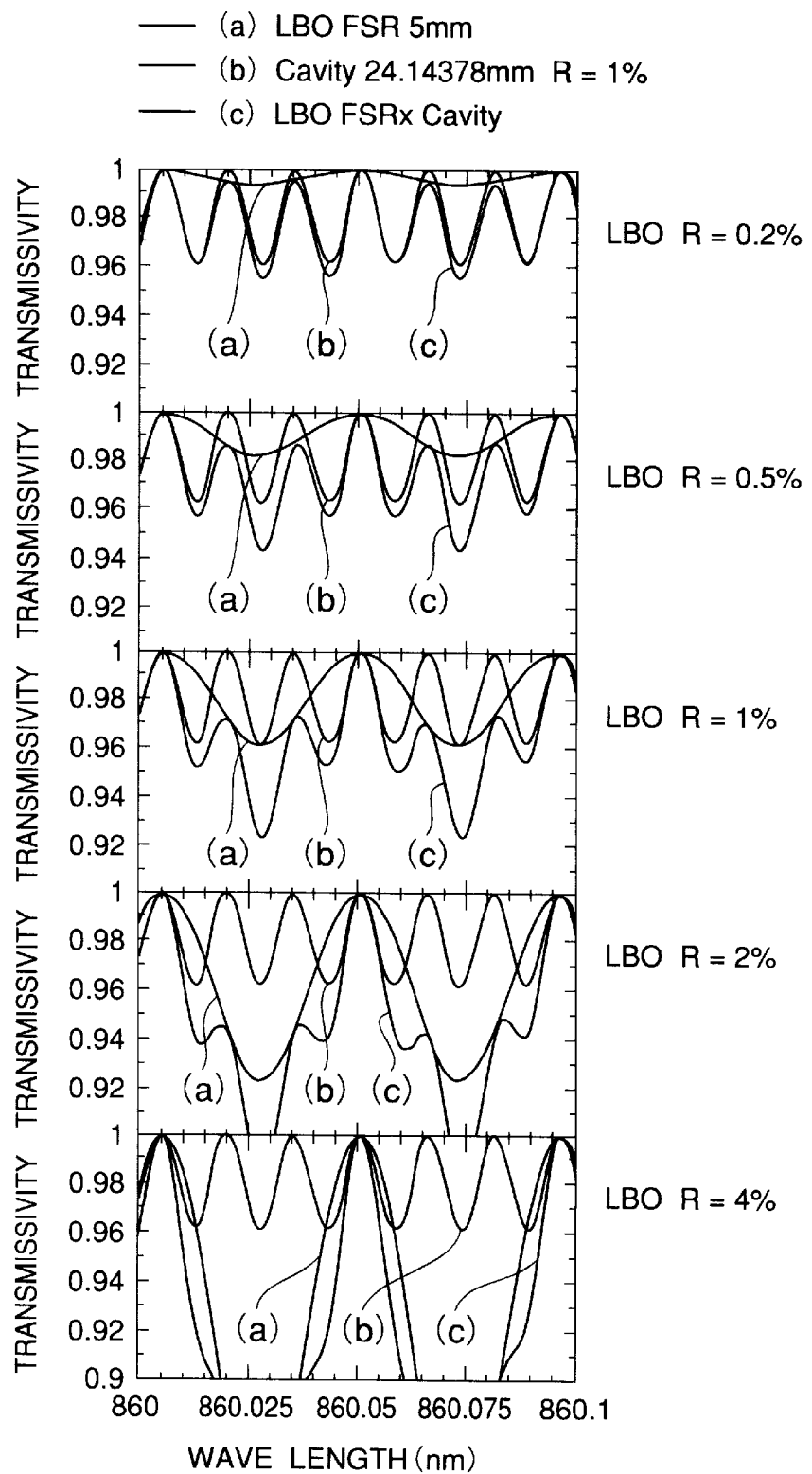
FIG. 8 are graphs showing the reflectance and transmission wavelength characteristics of LBO.

In FIG. 8, calculation results of the transmission wavelength characteristic (a) in a 5 mm thick LBO crystal, the transmission wavelength characteristic (b) to the length of the oscillator, and the total transmission wavelength characteristic of (a)×(b) in case that the reflectance of the LBO crystal is from 0.2% to 4%. The calculation was made with the length of the oscillator of 24.24378 mm and the full reflectance of 1%. From FIG. 8, it is found that adjacent oscillator longitudinal modes can be restrained by increasing the reflectance of LBO. Because it is easily analogized not to reach a laser oscillation because the oscillation loss increases when the reflectance of LBO is increased, it is considered that the reflectance is optimum when it is not more than 5%.

In case that an LiSAF ($Cr:LiSrAlF_6$; fluorolithium-strontium-aluminum with addition of chromium) crystal is used as the solid laser crystal, the first oscillation wave can be generated in the range of wavelength of 800 to 900 nm and the second oscillation wave in the blue range (wavelength of 400 to 450 nm) can be generated. Besides, in case that an LiSGAF ($Cr:LiSrGaF_6$; fluorolithium-strontium-gallium with addition of chromium) crystal is used as the above solid laser crystal, the first oscillation wave can be generated in the range of wavelength of 750 to 1000 nm and the second oscillation wave of a wavelength of 375 to 500 nm can be generated.

Even when BBO ($\beta$-$BaB_2O_4$), CLBO ($CsLiB_6O_{10}$), CBO ($CsB_3O_5$) or KN ($KNbO_3$) other than the LBO crystal is used as the nonlinear optical crystal, similar noise reduction can be realized. Besides, for obtaining SHG in the green range, a solid laser crystal to which rare earth such as Nd and Yb is added and KTP ($KTiOPO_4$) in addition to the above nonlinear crystal may be used.

Further, the first laser mirror 3, laser crystal 4 and wavelength selection element 5 are set on the same structure member 8, the SHG crystal 6 is set on a structure member 9, and they are fixed onto a Peltier element as a temperature control element to control the temperature of the whole of the oscillator. Because the length of the oscillator changes even by slightly shifting the temperature in the maximum state of the SHG output, a low-noise SHG output can be obtained.

EXAMPLE 2

Figure 9:
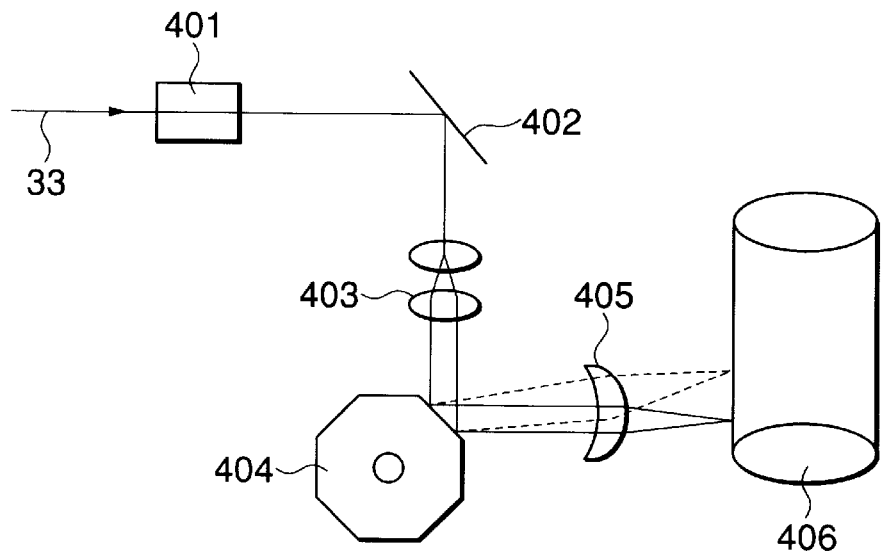
FIG. 9 is a view of a laser printer according to the present invention.

FIG. 9 is a view for illustrating an applied example of a laser printer using the present invention. An SHG output 33 emitted from the second-harmonic generator described in the example 1 is converged onto a photosensitive drum 406 through an acousto-optical (hereinafter called AO for short) modulator 401, a return mirror 402, a beam expander 403, a rotary many-sided mirror 404 and an fθ lens 405. The AO modulator 401 performs a modulation of the SHG output 33 according to information on picture, and the rotary many-sided mirror 404 scans horizontally (in a paper surface).

In this combination, two-dimensional information is recorded on the photosensitive drum 406 as a partial difference in electric potential. The photosensitive drum 406 rotates with toner adhered in accordance with the above difference in electric potential and reproduces information on a recording paper.

EXAMPLE 3

Figure 10:
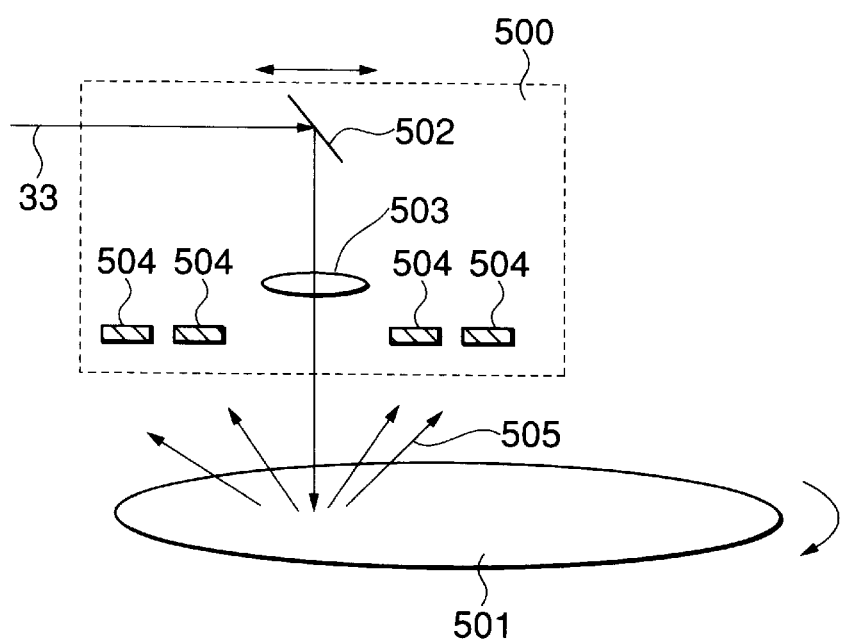
FIG. 10 is a view of a fine-particle inspection device according to the present invention.

FIG. 10 is a view for illustrating a device for detecting fine particles on an Si wafer as an applied example used as a fine-particle inspection device using the present invention. An SHG output 33 emitted from the second-harmonic generator described in the example 1 is incident on an optical head 500, converged to the diffraction limit by a return mirror 502 and a condensing lens 503, and applied to an Si wafer 501. Lights 505 scattered from the light converged to the wavelength order of 0.4 μm are received by i photodetectors 504 at the respective positions to record the intensities, and, by the optical head 500 moving from the central portion of the rotating wafer 501 to the end portion, the distribution of fine particles on the wafer surface is measured. Fine particles to the extent of 1/10 or less of the wavelength of SHG can be detected.

EXAMPLE 4

Figure 11:
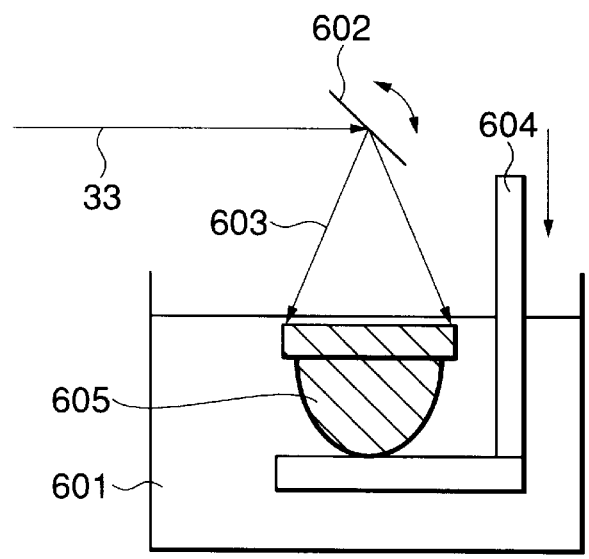
FIG. 11 is a view of an optical modeling device according to the present invention.

FIG. 11 is a view for illustrating an applied example in which an example of the present invention is used as an optical modeling device. As a light source, the second harmonic generator described in the example 1 was used. A vessel is filled with a blue-hardening resin 601, and an SHG output 33 emitted from the second-harmonic generator described in the example 1 scans two-dimensionally on the liquid surface by a mirror 602 as a laser light 603. At this time, in the blue-hardening resin 601, only the liquid surface portion having absorbed lights is hardened. After completing the formation of one throw, an elevator 604 descends successively to form the next throw. By this work, a solid model 605 of a desired shape could be formed.

EXAMPLE 5

Figure 12:
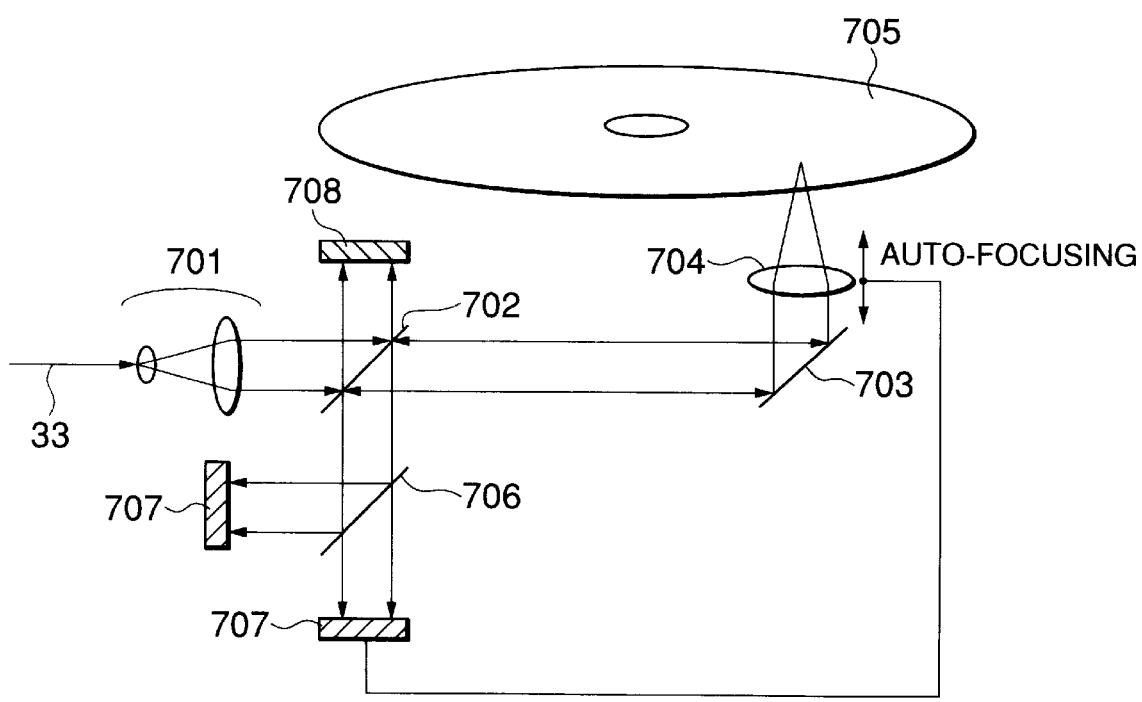
FIG. 12 is a view of an optical recording device according to the present invention.

FIG. 12 is a view for illustrating an applied example in which an example of the present invention is used as an optical recording device. An optical disk device employs an opto-magnetic recording system. An SHG laser light 33 emitted from the second-harmonic generator described in the example 1 is expanded by a beam expander 701 to be parallel lights. The lights a part of which has been cut off by a beam splitter 702 is taken in a photodetector 708 for front monitor and monitors the SHG laser light 33 to control the output. The beam having passed through the beam splitter 702 is converged onto a medium 705 by a convergent optical system 704, and the reflected light is partially reflected by the beam splitter 702, then divided into two beams by a beam splitter 706, and taken in two photodetectors to perform auto-focusing and signal detection, respectively. A fixed magnetic field is applied to the medium 705, and recording is performed by modulating the SHG laser light 33 and raising the temperature at the focus to the Curie temperature of the medium 705 to reverse the magnetization. When the laser light is ON, it is recorded by reversing the magnetization of the medium. The recording frequency was 10 MHz. Besides, by using the same SHG laser light at playback signal, a good playback signal could be obtained.

As described above in detail, by effectuating the present invention, reduced noise in an output of a second-harmonic generator in which a first oscillation wave from a solid laser crystal generating the first oscillation wave is used as a base wave can be intended. Although the construction of the oscillator is the same as conventional one, because the relations between parts in the oscillator are regulated distinctly, it can be easily effectuated. Besides, because a light source in which noise at 3 MHz or less contained in the output is considerably reduced, it is applicable also to a printing-typing device, a detector, an optical recording device or the like that is a hindrance to improving the conventional performance or downsizing, so the effect is great.

The present invention is not limited to the above-described examples, and various modifications are possible within the scope shown in the claims.

What is claimed is:

1. A reduced noise second-harmonic generator, comprising:
    an exciting light provider providing exciting light; and
    an oscillator comprising
        a first laser mirror;
        a second laser mirror;
        a solid laser crystal provided between the first and the second laser mirrors that uses the exciting light to produce a oscillation laser light, and
        a nonlinear optical crystal having a length, provided between the first and the second laser mirrors, wherein a length of the oscillator is a multiple of the length of the nonlinear optical crystal, the obtained oscillation laser light is incident on said nonlinear optical crystal as a base wave to obtain a laser light of double frequency, and a free spectral range is dependent on the length of at least the nonlinear optical crystal to thereby reduce noise in the second-harmonic generator.

2. A reduced-noise second-harmonic generator according to claim 1, wherein a phase of a free spectral range of the oscillator coincides with a phase of the free spectral range corresponding to the length of at least the nonlinear optical crystal.

3. A reduced-noise second-harmonic generator according to claim 3, wherein a reflectance of an emission side end surface of the nonlinear optical crystal is not less than 99% for the base wave and a reflectance of an incident side end surface is not more than 5%.

4. A reduced-noise second-harmonic generator according to claim 3, wherein an output wavelength range of the oscillator is 375 to 550 nm and noise at less than 3 MHz contained in an output is restrained.

5. A reduced-noise second-harmonic generator according to claim 3, wherein the oscillation laser light generated in the oscillator is the multimode.

6. A laser application device according to claim 2, wherein the reduced-noise second-harmonic generator is a light source of a printing-type device, a fine-particle detector, an optical modeling device or an optical recording device.

7. A reduced-noise second-harmonic generator according to claim 1, wherein a reflectance of an emission side end surface of the nonlinear optical crystal is not less than 99% for the base wave and a reflectance of an incident side end surface is not more than 5%.

8. A reduced-noise second-harmonic generator according to claim 1, wherein an output wavelength range of the oscillator is 375 to 550 nm and noise at less than 3 MHz contained in an output is restrained.

9. A reduced-noise second-harmonic generator according to claim 1, wherein the oscillation laser light generated in the oscillator is multimode.

10. A laser application device according to claim 9, wherein the reduced-noise second-harmonic generator is a light source of a printing-type device, a fine-particle detector, an optical modeling device or an optical recording device.

11. A laser application device according to claim 1, wherein the reduced-noise second-harmonic generator is used as a light source of a printing-type device, a fine-particle detector, an optical modeling device or an optical recording device.

12. A reduced noise second-harmonic generator comprising:
   an oscillator comprising
      a first laser mirror;
      a second laser mirror;
      a solid laser crystal provided between said first and second laser mirrors;
      a nonlinear optical crystal provided between said first and second laser mirrors; and
      a wavelength selection element provided between said first and second laser mirrors,
   wherein said solid laser crystal is excited by an exciting light provided outside of said oscillator and obtained oscillation laser light is incident on said nonlinear optical crystal as a base wave to obtain a laser light of double frequency, and a free spectral range dependent on the length of the oscillator of said base wave has a relation of integral times with respect to a free spectral range dependent on a length of at least said nonlinear optical crystal or wavelength selection element to thereby reduce noise in the second-harmonic generator.

13. A reduced-noise second-harmonic generator according to claim 2, wherein a reflectance of an emission side end surface of the nonlinear optical crystal is not less than 99% for the base wave and a reflectance of an incident side end surface is not more than 5%.

14. A reduced-noise second-harmonic generator according to claim 2, wherein an output wavelength range of the oscillator is 375 to 550 nm and noise at less than 3 MHz contained in an output is restrained.

15. A reduced-noise second-harmonic generator according to claim 2, wherein the oscillation laser light generated in the oscillator is multimode.

16. A reduced-noise second-harmonic generator according to claim 2, wherein a phase of a free spectral range of the oscillator coincides with a phase of the free spectral range corresponding to the length of at least the nonlinear optical crystal or wavelength selection element.

17. A laser application device according to claim 2, wherein the reduced-noise second-harmonic generator is a light source of a printing-type device, a fine-particle detector, an optical modeling device or an optical recording device.

18. A reduced-noise second-harmonic generator, comprising:
   a first laser mirror;
   a second laser mirror;
   a solid laser crystal; and
   a nonlinear optical crystal;
   wherein a distance between the first laser mirror and the solid laser crystal is L1,
   a distance between the solid laser crystal and the nonlinear optical crystal is L2, and a distance between the nonlinear optical crystal and the second laser mirror is L3, wherein the nonlinear optical crystal has a length shown by $$L_{SHG}=M(L1+L2+L3+n_{LASER} \times L_{LASER})/(N-M) \times n_{SHG}$$

wherein the lengths and refractive indexes of the solid laser crystal and nonlinear optical crystal are $L_{LASER}$ and $n_{LASER}$ and $L_{SHG}$ and $n_{SHG}$ respectively, M and N are positive integers indicating the degree of mode and N>M, to thereby reduce noise in the second-harmonic generator.

19. A reduced-noise second-harmonic generator according to claim 4, wherein the relation between the length of the oscillator, the solid laser crystal and the nonlinear optical crystal is $$L_{cavity}-(n_{Laser} \times L_{Laser}+n_{SHG} \times L_{SHG}+n_{BF} \times L_{BF})<10 \text{ mm}$$

wherein $L_{cavity}$ is the total length of the oscillator.

20. A laser application device according to claim 19, wherein the reduced-noise second-harmonic generator is a light source of a printing-type device, a fine-particle detector, an optical modeling device or an optical recording device.

21. A reduced-noise second-harmonic generator according to claim 4, wherein a reflectance of an emission side end surface of the nonlinear optical crystal is not less than 99% for the base wave and a reflectance of an incident side end surface is not more than 5%.

22. A reduced-noise second-harmonic generator according to claim 4, wherein an output wavelength range of the oscillator is 375 to 550 nm and noise at less than 3 MHz contained in an output is restrained.

23. A reduced-noise second-harmonic generator according to claim 4, wherein the oscillation laser light generated in the oscillator is multimode.

24. A laser application device according to claim 18, wherein the reduced-noise second-harmonic generator is a light source of a printing-type device, a fine-particle detector, an optical modeling device or an optical recording device.

25. A reduced-noise second-harmonic generator, comprising:
   a first laser mirror;
   a second laser mirror;
   a solid laser crystal; and
   a nonlinear optical crystal;
   wherein a distance between the first laser mirror and the solid laser crystal is L1,
   a distance between the solid laser crystal and the nonlinear optical crystal is L2, and a distance between the nonlinear optical crystal and the second laser mirror is L3, wherein the nonlinear optical crystal has a length shown by $$L_{SHG}=M(L4+L5+L6+n_{LASER} \times L_{LASER}+n_{LASER}+n_{BF} \times L_{BF})/(N-M) \times n_{SHG}$$

wherein the lengths and refractive indexes of the solid laser crystal, birefringent crystal and nonlinear optical crystal are $L_{LASER}$ and $n_{LASER}$, $L_{BF}$ and $n_{BF}$ and $L_{SHG}$ and $n_{SHG}$, respectively, M and N are positive integers indicating the degree of mode and N>M, to thereby reduce noise in the second-harmonic generator.

26. A reduced-noise second-harmonic generator according to claim 5, wherein a reflectance of an emission side end surface of the nonlinear optical crystal is not less than 99% for the base wave and a reflectance of an incident side end surface is not more than 5%.

27. A reduced-noise second-harmonic generator according to claim 5, wherein an output wavelength range of the oscillator is 375 to 550 nm and noise at less than 3 MHz contained in an output is restrained.

28. A reduced-noise second-harmonic generator according to claim 5, wherein the oscillation laser light generated in the oscillator is multimode.

29. A reduced-noise second-harmonic generator according to claim 5, wherein the relation between the length of the oscillator, solid laser crystal and the nonlinear optical crystal is $$L_{cavity} - (n_{Laser} \times L_{Laser} + n_{SHG} \times L_{SHG} + n_{BF} \times L_{BF}) < 10 \text{ mm}$$

wherein $L_{cavity}$ is the total length of the oscillator.

30. A laser application device according to claim 25, wherein the reduced-noise second-harmonic generator is a light source of a printing-type device, a fine-particle detector, an optical modeling device or an optical recording device.

* * * * *

UNITED STATES PATENT AND TRADEMARK OFFICE
CERTIFICATE OF CORRECTION

| | | |
|---|---|---|
| PATENT NO. | : 6,233,260 B1 | Page 1 of 1 |
| APPLICATION NO. | : 09/271245 | |
| DATED | : May 15, 2001 | |
| INVENTOR(S) | : Satoshi Makio et al. | |

It is certified that error appears in the above-identified patent and that said Letters Patent is hereby corrected as shown below:

Column 10     line 30 (claim 1), change "," to --;--
                      line 47 (claim 3), change "3" to --2--;
                      line 52 (claim 4), change "3" to --2--;
                      line 57 (claim 5), change "3" to --2--.

Column 11     line 40 (claim 13), change "2" to --12--;
                      line 45 (claim 14), change "2" to --12--;
                      line 49 (claim 15), change "2" to --12--;
                      line 52 (claim 16), change "2" to --12--;
                      line 56 (claim 17), change "2" to --12--.

Column 12     line 17 (claim 19), change "4" to --18--;
                      line 29 (claim 21), change "4" to --18--;
                      line 34 (claim 22), change "4" to --18--;
                      line 38 (claim 23), change "4" to --18--.

Column 13     line 2 (claim 26), change "5" to --25--;
                      line 7 (claim 27), change "5" to --25--;
                      line 11 (claim 28), change "5" to --25--.

Column 14     line 2 (claim 29), change "5" to --25--.

Signed and Sealed this

Twenty-second Day of January, 2008

JON W. DUDAS
*Director of the United States Patent and Trademark Office*